United States Patent [19]
Pan et al.

[11] Patent Number: 5,311,178
[45] Date of Patent: May 10, 1994

[54] METHOD FOR PROCESSING SAMPLE VALUES IN AN RLL CHANNEL

[75] Inventors: Tzu-Wang Pan, Irvine; Richard G. Yamasaki, Torrance, both of Calif.

[73] Assignee: Silicon Systems, Inc., Tustin, Calif.

[21] Appl. No.: 930,718

[22] Filed: Aug. 14, 1992

[51] Int. Cl.$^5$ .............................................. G11B 5/09
[52] U.S. Cl. ...................................... 341/59; 360/46; 360/32
[58] Field of Search ..................... 341/59, 155, 157; 360/32, 46, 51

[56] References Cited

U.S. PATENT DOCUMENTS

| | | | |
|---|---|---|---|
| 4,672,597 | 6/1987 | Yamazaki | 369/59 |
| 4,724,496 | 2/1988 | White | 360/46 |
| 4,868,689 | 9/1989 | Egami et al. | 360/32 |
| 4,958,243 | 9/1990 | Chen et al. | 360/51 |
| 4,979,189 | 12/1990 | Wile | 375/95 |
| 4,984,255 | 1/1991 | Davis et al. | 375/106 |
| 5,107,379 | 4/1992 | Huber | 360/46 |
| 5,142,420 | 8/1992 | Tanaka et al. | 360/32 |

*Primary Examiner*—Marc S. Hoff
*Attorney, Agent, or Firm*—Hecker & Harriman

[57] ABSTRACT

The present invention describes an improved RLL channel utilizing a closed-loop clock recovery scheme and a simplified decoding algorithm. (1,7) run-length-limited (RLL) code is used to reduce the magnetic nonlinearity problem posed by prior art PRML systems. In the preferred embodiment of the present invention, the analog data signal amplified, filtered and equalized to approximate an ideal waveform. The signal is then sampled and decoded into binary data. The clock recovery circuit is designed to sample the analog data such that the signal peak lies centered between consecutive sample points. It is thus made possible for the phase error to be extracted from a direct comparison of neighboring sample values. The phase error is then used to adjust the clock signal for the following samples. In the decoding algorithm of the present invention, by making useful approximations, the complexity of the decision functions is reduced, along with the number of required look-ahead samples. The reduction in look-ahead samples reduces the system's sensitivity to misequalization.

7 Claims, 8 Drawing Sheets

| Positive Phase | | | | | | |
|---|---|---|---|---|---|---|
| Function of Look-ahead sample values | Nominal Thresholds at state | | | | | Decision Variable |
| | 0000 | 1000 | 1100 | 0001 | 1001 | |
| Baseline Check $Fa = y_1 + y_2$ $Fb = y_1 + y_2 - y_3$ | $Fa > \beta$ $Fb > \beta$ | $Fa > \beta$ $Fb > \beta$ | $Fa > \beta-\alpha$ $Fb > \beta-\alpha$ | – – | – – | A B |
| Peak Check $Fx = y_1 - y_3 + K_1 y_0$ $Fy = y_1 - y_3 \pm K_1 y_0$ $Fz = y_3 - y_4 - K_2 y_0 - K_3 y_1$ | $Fx > 0$ $Fy > \alpha$ $Fz < THz$ | $Fx > -K_1\alpha$ $Fy > \alpha - K_1\alpha$ $Fz < THz - K_2\alpha$ | $Fx > -\alpha - K_2\beta$ $Fy > -K_2\beta$ $Fz < THz - K_2\beta - K_3\alpha$ | – – – | – – – | X Y Z |

| Negative Phase | | | | | | |
|---|---|---|---|---|---|---|
| Function of Look-ahead sample values | Nominal Thresholds at state | | | | | Decision Variable |
| | 1111 | 0111 | 0011 | 1110 | 0110 | |
| Baseline Check $Fa = y_1 + y_2$ $Fb = y_1 + y_2 - y_3$ | $-Fa > \beta$ $-Fb > \beta$ | $-Fa > \beta$ $-Fb > \beta$ | $-Fa > \beta-\alpha$ $-Fb > \beta-\alpha$ | – – | – – | A B |
| Peak Check $Fx = y_1 - y_3 + K_1 y_0$ $Fy = y_1 - y_3 + K_1 y_0$ $Fz = y_3 - y_4 - K_2 y_0 - K_3 y_1$ | $-Fx > 0$ $-Fy > \alpha$ $-Fz < THz$ | $-Fx > -K_1\alpha$ $-Fy > \alpha - K_1\alpha$ $-Fz < THz - K_2\alpha$ | $-Fx > -\alpha - K_2\beta$ $-Fy > -K_2\beta$ $-Fz < THz - K_2\beta - K_3\alpha$ | – – – | – – – | X Y Z |

$K_1 = \alpha/(\beta-\alpha)$    $K_2 = \alpha/(\beta-2\alpha)$ $K_3 = (\beta-\alpha)/(\beta-2\alpha)$    $THz = ((2-K_3)\beta - (K_2+K_3)\alpha)/2$

FIG. 5A

| Current State | Next State/Decoded Data | |
|---|---|---|
| | (A+B) & X & (Y+Z) = 0 | (A+B) & X & (Y+Z) = 1 |
| Positive Phase | | |
| 0000 | 0000/0 | 0001/0 |
| 0001 | 0011/1 | 0011/1 |
| 1000 | 0000/0 | 0001/0 |
| 1001 | 0011/1 | 0011/1 |
| 1100 | 1000/0 | 1001/0 |
| Negative Phase | | |
| 0011 | 0111/0 | 0110/0 |
| 0110 | 1100/1 | 1100/1 |
| 0111 | 1111/0 | 1110/0 |
| 1110 | 1100/1 | 1100/1 |
| 1111 | 1111/0 | 1110/0 |

| Function of Look-ahead sample values | Nominal Thresholds at state | | | | | | Decision Variable |
|---|---|---|---|---|---|---|---|
| | 100 | 000 | 001 | 011 | 111 | 110 | |
| Baseline Check | | | | | | | |
| $Fa = y_1 + y_2$ | $Fa > \beta-\alpha$ | $Fa > \beta$ | – | $-Fa > \beta-\alpha$ | $-Fa > \beta$ | – | A |
| $Fb = y_1 + y_2 - y_3$ | $Fb > \beta-\alpha$ | $Fb > \beta$ | – | $-Fb > \beta-\alpha$ | $-Fb > \beta$ | – | B |
| Peak Check | | | | | | | |
| $Fx = y_1 - y_3$ | $Fx > -\alpha$ | $Fx > 0$ | – | $-Fx > -\alpha$ | $-Fx > 0$ | – | X |
| $Fy = y_1 - y_3$ | $Fy > 0$ | $Fy > \alpha$ | – | $-Fy > 0$ | $-Fy > \alpha$ | – | Y |
| $Fz = y_3 - 2y_1 - y_4$ | $Fz < \alpha$ | $Fz < -\alpha$ | – | $-Fz < \alpha$ | $-Fz < -\alpha$ | – | Z |

FIG. 6B

| Current State | Next State/Decoded Data | |
|---|---|---|
| | (A+B) & X & (Y+Z) = 0 | (A+B) & X & (Y+Z) = 1 |
| Positive Phase | | |
| 100 | 000/0 | 001/0 |
| 000 | 000/0 | 001/0 |
| 001 | 011/1 | 011/1 |
| Negative Phase | | |
| 011 | 111/0 | 110/0 |
| 111 | 111/0 | 110/0 |
| 110 | 100/1 | 100/1 |

METHOD FOR PROCESSING SAMPLE VALUES IN AN RLL CHANNEL

BACKGROUND OF THE INVENTION

1. Field of the Invention

The present invention relates to the field of signal processing in a channel, and in particular, to signal processing in a magnetic recording channel.

2. Background Art

In magnetic recording devices, such as magnetic disks and tapes, a recording head is used to read and write information to and from a magnetic surface. In a typical rotating medium-based storage system, data is stored on magnetic disks in a series of concentric "tracks." These tracks are accessed by a read/write head that detects variations in the magnetic orientation of the disk surface. The read/write head moves back and forth radially on the disk under control of a head-positioning servo mechanism so that it can be selectively positioned over a selected one of the tracks. Once in position over a track, the servo mechanism causes the head to trace a path that follows the center line of the selected track.

Generally, the inductive recording head consists of a slit toroid made up of high permeability magnetic material and wound by several conductor turns. The toroid contains a gap which is positioned over the data tracks on the magnetic recording surface. To record, a current is generated through the conductor windings, altering the magnetic field in the toroid. At the location of the gap, the amplitude of the magnetic field is large enough to record on the magnetic material of the storage device to a sufficient depth. The amplitude of the magnetic field falls off sharply away from the gap. By manipulating the current through the conductor windings, the magnitude and direction of the magnetic flux at the location of the gap can be modulated in such a fashion as to encode information into the magnetic surface of the storage device. A pattern of external and internal fields are created as the head and recording surface are moved relative to each other. These patterns are similar to a series of bar magnets of changing polarities. The polarity transitions are then readable as transitions in the magnetic flux at the recording surface. In read mode, as the magnetic storage surface moves across the gap in the head, the magnetic field of the storage surface is detected at the gap, and a voltage is induced in the coil proportional to the rate of change of the flux. The read channel then processes this analog voltage signal to obtain the digital data.

Magnetic storage devices sometimes use analog peak detection to process incoming read signals. However, as recording density increases, the analog peak detection scheme becomes unreliable because of the large amount of inter-symbol interference (ISI) between adjacent pulses. Alternatively, a partial response maximum likelihood (PRML) channel can be used to increase the recording density. However, this method requires very good equalization of the read signal and the code is completely incompatible with the currently widely used (1,7) run-length limited (RLL) code. More importantly, the required number of magnetic flux transitions per inch is 50 percent higher than that of the (1,7) code at the same density. Therefore, the magnetic non-linearity problem is more severe for the PRML system, and could even render it unusable at high recording densities.

Run-length limited (RLL) codes are useful because they place an upper bound on the number of clock cycles occurring between transitions. Because clock recovery is based on the occurrence of these transitions, this upper bound is very important. For example, a long train of "0's " in a data sequence produces no transitions and the clock recovery circuit has no input pulse with which to synchronize its tracking. In this situation, the data recovery timing might drift out of phase. For this reason, RLL codes are used to insure that sufficient transitions occur for the clock recovery circuit to maintain the correct timing phase and frequency. The (1,7) RLL code is characterized by a minimum of one "0" and a maximum of seven "0's" between consecutive "1's". In an NRZI format, where each "1" is represented by a transition, and each "0" is represented by the lack of a transition, the (1,7) RLL code is sufficient for clock recovery purposes. Also, by maintaining the minimum of one "0" between consecutive "1's", transitions are separated so as to be differentiable from one another.

It is desirable to have a signal processing method that uses RLL codes and can still improve the detection margin at high recording densities. In A.M. Patel's article "A New Digital Signal Processing Channel for Data Storage Products," in *Digest of the Magnetic Recording Conference*, of June 1991, pp. E6–E7, and in U.S. Pat. No. 4,945,538 issued to Patel, a (1,7) ML channel is described that is intended to achieve these goals.

A block diagram of the channel described by Patel is illustrated in FIG. 1. The analog read signal, originating from the read head, is amplified in preamplifier (preamp) 111 and then provided to filter 112 for the removal of high-frequency noise components. The filtered signal is then provided to phase-locked loop clock circuit 113 and delay line 114. Delay line 114 provides the delayed signal to analog-to-digital converter (ADC) 115 where the signal is digitized. The digitized signal is passed through equalizer 116 to obtain a more desirable waveform, and the result is provided to decoder 118. Decoder 118 implements a decoding algorithm to generate the digital data signal 119. The analog-to-digital converter 115 and decoder 118 are clocked by a clock signal 117 generated in phase-locked loop clock circuit 113.

There are several drawbacks to the (1,7) ML channel. It is difficult, to derive the read clock directly from the sample data. Patel mentions that a conventional peak detection channel is used to provide timing reference for the phase-lock loop, and an adjustable delay line is needed to cancel the timing mismatch between the peak detection channel and the (1, 7) ML channel. Due to the open loop characteristics of this approach, this method is unable to obtain very precise timing recovery. Also, delay lines are costly and unsuitable for monolithic integrated circuit implementation. Another disadvantage is the decoding functions involve five sample values and, therefore, are sensitive to mis-equalization because errors will accumulate in certain data patterns.

With a large number of sample values involved in the decoding operations of a channel, a strict requirement is placed on the equalizer. Because the decoding functions serve to match the sample values against an expected waveform, the equalizer must force the signal to conform to this expected shape. With a smaller amount of sample values involved, the constraints placed on the equalizer are less stringent and are thus more likely to be physically realizable.

FIG. 7A depicts the peak detection clock recovery circuit of the prior art. Input signal 700 represents the output of filter 112 from FIG. 1. Input signal 700 is provided to block 701 wherein its derivative with respect to time is generated as signal 702. However, circuits for generating this derivative are noisy. Therefore, a noise error model is included in FIG. 7A comprising noise signal 703 added to the derivative 702 in adder 704. The resulting signal 705, with the noise superimposed on the derivative signal, is provided to a zero crossing detector 706. Ideally, when the input signal 700 reaches a positive or negative peak, the derivative input to the zero crossing detector will be exactly zero, and the output of the detector, signal 707, will be "1". However, in physical realizations, the noise in signal 705 will cause the actual zero occurrence to be misaligned by the magnitude of the noise error.

Block 708 comprises threshold compactors for indicating whether the input signal 700 has reached a minimum qualifying threshold. When the signal is above a certain positive threshold, or below a certain negative threshold, signal 709 will be asserted. AND gate 710 will output a "1" on line 711 only if both signals 707 and 709 are asserted. The presence of the threshold comparators 708 insures that local peaks caused by noise in signal 700 are not mistakenly interpreted as signal transitions. The assertion of signal 711 signifies a peak. This "peak detected" signal is provided to a standard phase-locked loop 712 comprising a phase detector 731 for receiving signal 711, a loop filter 732 for filtering the output of phase detector 731, and a voltage-controlled oscillator 733 (VCO) controlled by the output of the filter and connected in feedback to the phase detector. The output 117 of the VCO is the clock signal for the system.

SUMMARY OF THE PRESENT INVENTION

The present invention describes an improved RLL channel utilizing a closed-loop clock recovery scheme and a simplified decoding algorithm. (1,7) run-length-limited (RLL) code is used to reduce the magnetic nonlinearity problem posed by prior art PRML systems. In the preferred embodiment of the present invention, the analog data signal is amplified, filtered and equalized to approximate an ideal waveform. The signal is then sampled and decoded into binary data.

The clock recovery circuit is designed to sample the analog data such that the signal peak lies centered between consecutive sample points. It is thus possible for the phase error to be extracted from a direct comparison of neighboring sample values. The phase error is then used to adjust the clock signal for the following samples.

In the decoding algorithm of the present invention, by making approximations, the complexity of the decision functions is reduced, along with the number of required look-ahead samples. The reduction in look-ahead samples reduces the system's sensitivity to misequalization.

BRIEF DESCRIPTION OF THE DRAWINGS

FIG. 5A is a table of the functions and decision thresholds for the general decoding algorithm of the present invention.

FIG. 5B is a table showing the next state and decoded data in the decision process of the general decoding algorithm.

FIG. 6A is a table of the functions and decision thresholds for the simplified decoding algorithm of the present invention.

FIG. 6B is a table showing the next state and decoded data in the decision process of the simplified decoding algorithm.

DETAILED DESCRIPTION OF THE PRESENT INVENTION

A method for processing sample values in an RLL channel is described. In the following description, numerous specific details are described in order to provide a more thorough description of the present invention. It will be apparent, however, to one skilled in the art, that the present invention may be practiced without these specific details. In other instances, well-known features have not been described in detail in order not to unnecessarily obscure the present invention.

The preferred embodiment of the present invention is employed as part of a read channel for data recovery in a magnetic storage system. (1,7) RLL encoded data is provided to the read channel as a series of analog pulses. The analog signal is processed to provide a more ideal signal, and then is sampled and digitized before being decoded into binary data. The present invention utilizes a closed-loop timing recovery system. With the incorporation of feedback into the timing circuit, the tracking capability of the clock recovery circuitry is superior to that of the open-loop systems of the prior art.

The clock recovery circuitry of the present invention receives the sampled data values from the data sampler and compares the signal levels of neighboring samples directly. The sampling points for the method of the present invention are offset one-half clock cycle from those of a typical peak detection scheme. This allows the phase comparator to operate directly on neighboring samples without requiring a programmable delay line to make up for timing misalignment between the clock recovery circuitry and the data channel. The difference between the sampled signal levels indicates the amount of phase error. This phase error is used to control the frequency of a voltage-controlled oscillator (VCO) that lies within a phase-locked loop. The output signal of the VCO is then used to clock the data sampler and decoder. Thus, feedback is established between the data sampler and the clock recovery circuitry. The feedback loop is designed to minimize the phase error.

Figure 1:
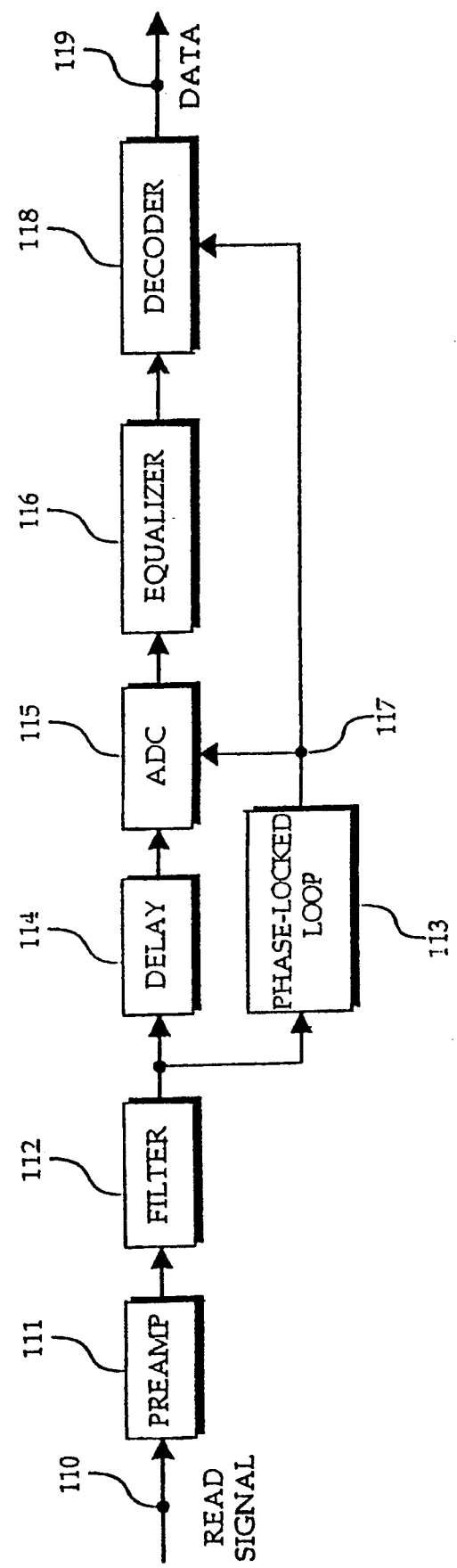
FIG. 1 is a block diagram of a (1,7) ML channel of the prior art.
Figure 2:
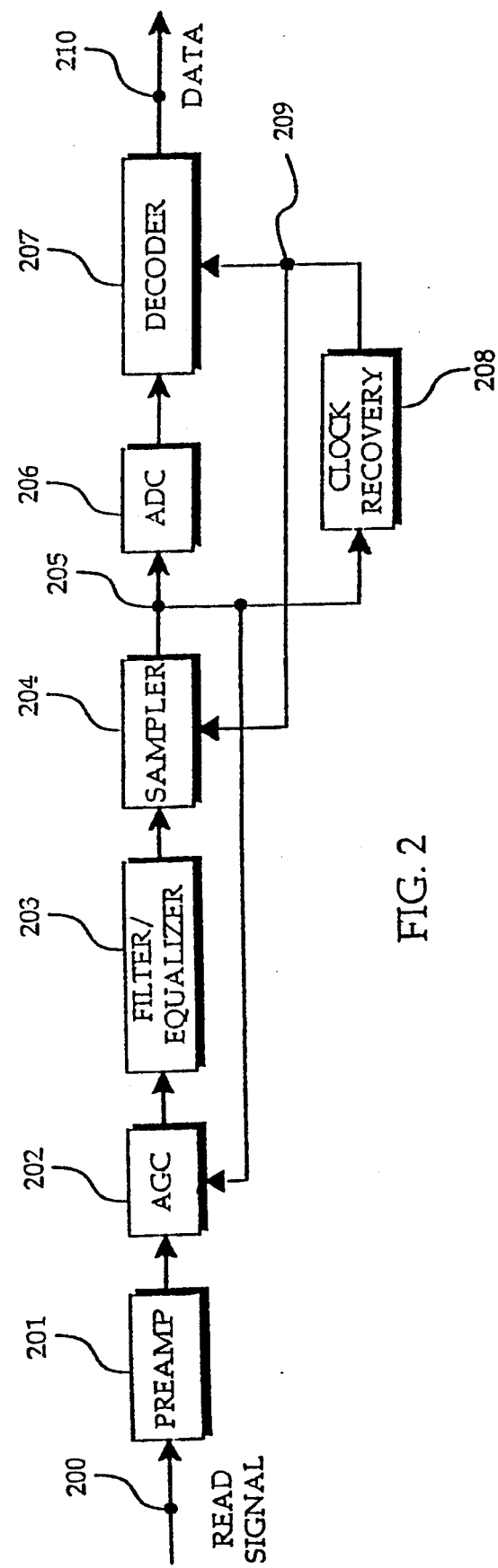
FIG. 2 is a block diagram of the preferred embodiment of an RLL channel of the present invention.

FIG. 2 is a block diagram of the preferred embodiment of the present invention. Read signal 200 is generated from a signal source, such as a magnetic read head, and is provided to preamplifier 201. The amplified signal is then provided to an automatic gain control (AGC) amplifier 202 so that the sampled values are at desired levels. The signal is then passed through filter 203 where undesired frequency components are removed. An equalizer is responsible for shaping the read pulses into the desired waveforms.

Sampler 204, following the filter 203, samples the continuous-time read signal and generates discrete-time data samples. The discrete-time data samples 205 are provided to AGC 202, analog-to-digital converter 206 and clock recovery circuit 208. Clock recovery 208 provides clock signals 209 to sampler 204 and decoder 207. The analog-to-digital converter 206 provides digitized sample values to decoder 207 where a decoding algorithm is implemented to produce data signal 210.

The detection and decoding method described herein can be implemented in either an analog or a digital approach. An analog-to-digital converter (ADC) is used to convert the samples into digital values, if the digital approach is chosen. An analog decoder is also feasible where an ADC is not necessary. The equalizer for the system can also be either digital or analog. If it is digital, it is positioned after the ADC. If it is analog, it can be combined with the filter as shown in FIG. 2.

Figure 3A:
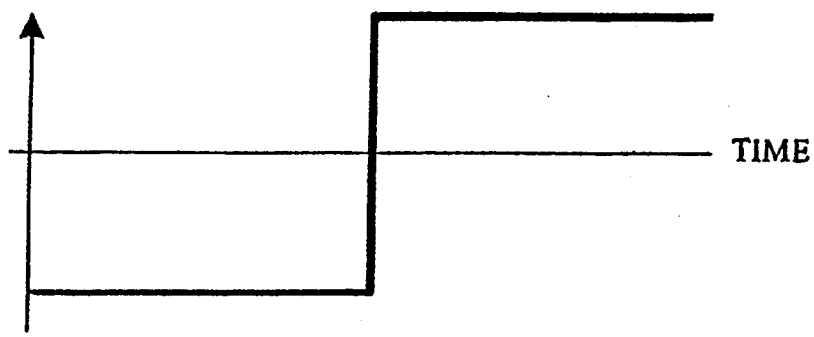
FIG. 3A illustrates a single transition of the wire current in a magnetic recording system.
Figure 3B:
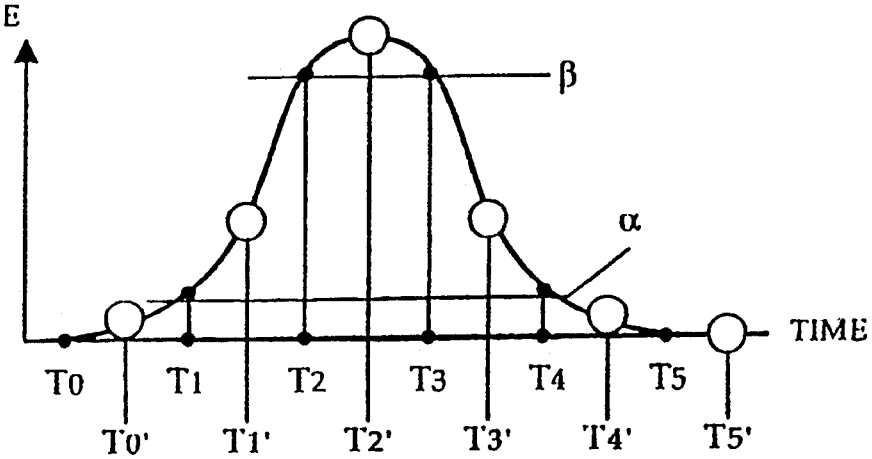
FIG. 3B illustrates the equalized response to the single write current transition of FIG. 3A.

FIG. 3A depicts a single transition of the write current. FIG. 3B illustrates the equalized response to a single transition. As shown, a positive response pulse is produced from a positive write current transition. Similarly, a negative write current transition produces a negative response pulse. The sample values of the present invention are taken at time $T_K$, where $K=0, \ldots, 5$. The sample values taken at T0-T5 are 0, $\alpha$, $\beta$, $\beta$, $\alpha$ and 0, respectively. The automatic gain control circuit 202 regulates the sample value $\beta$ to a predetermined magnitude.

Comparing the sampling points of the present invention with the sampling points of the traditional EPR4 waveform used in the (1, 7) ML channel, the sampling points of the present invention are offset by one-half of a clock cycle. The sampling points of the EPR4 waveform are illustrated in FIG. 3B as the samples taken at times $T_K'$, where $K=0, \ldots, 5$, Because the sample point $T_2'$ of the EPR4 waveform occurs exactly at the peak of the response, further signal processing is required before the read clock can be extracted from the signal. In the method of the present invention, however, the samples taken at times $T_2$ and $T_3$ are taken at approximately one-half clock cycle to either side of the response peak. This feature enables the system of the present invention to extract the read clock directly from the sample data.

The read clock is extracted by a phase-lock loop that uses a sampled-data phase detector to drive a voltage-controlled oscillator (VCO). Phase error between the VCO and the read signal is obtained by comparing the levels of the neighboring sampled signal values. Since the phase detector monitors the sampled signal values directly, there is no timing misalignment, therefore, a programmable delay line is not necessary. The extracted clock is supplied to the sampler and the decoder as a timing control signal.

Figure 7A:
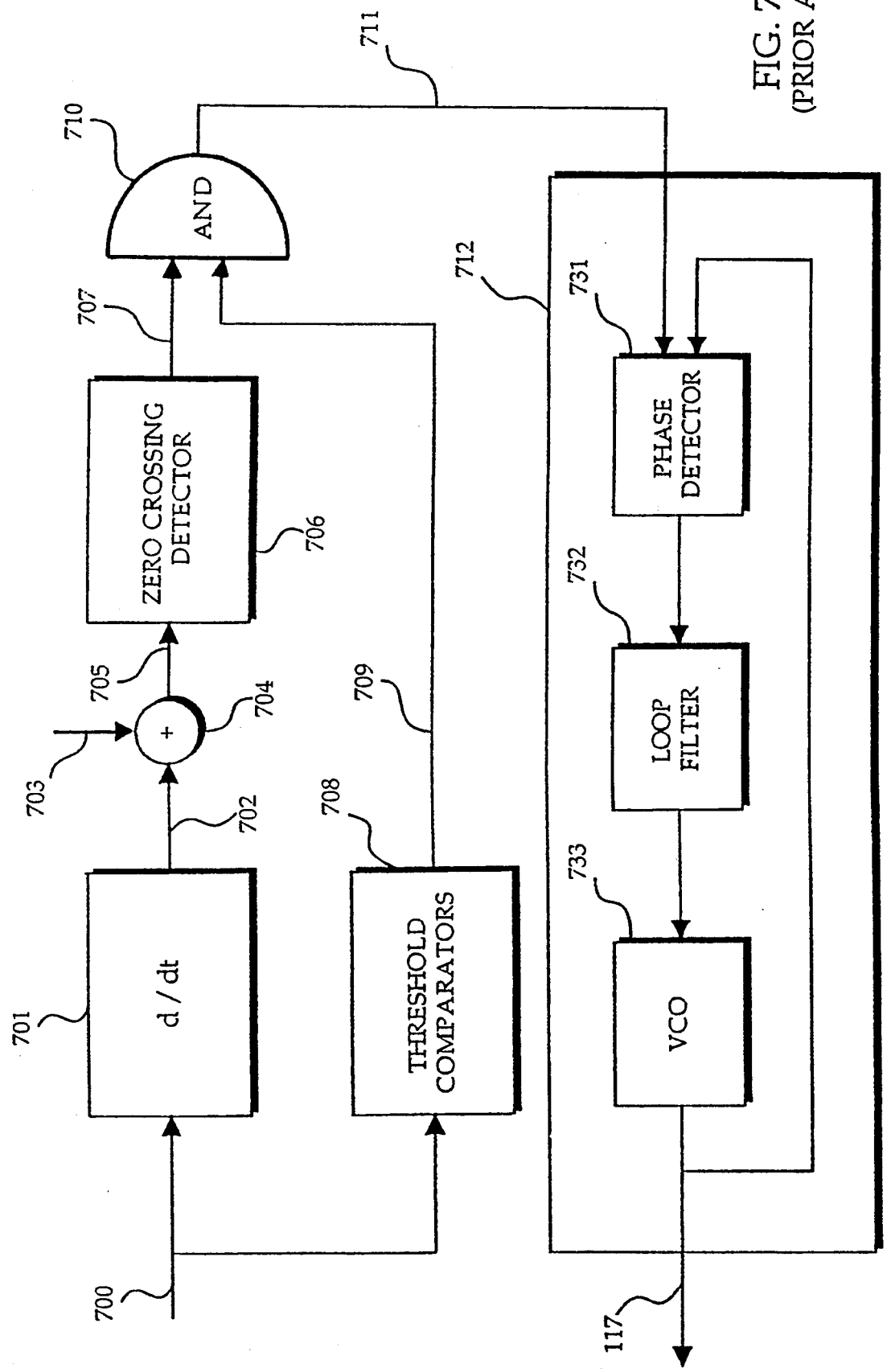
FIG. 7A is a block diagram of a prior art clock recovery system.
Figure 7B:
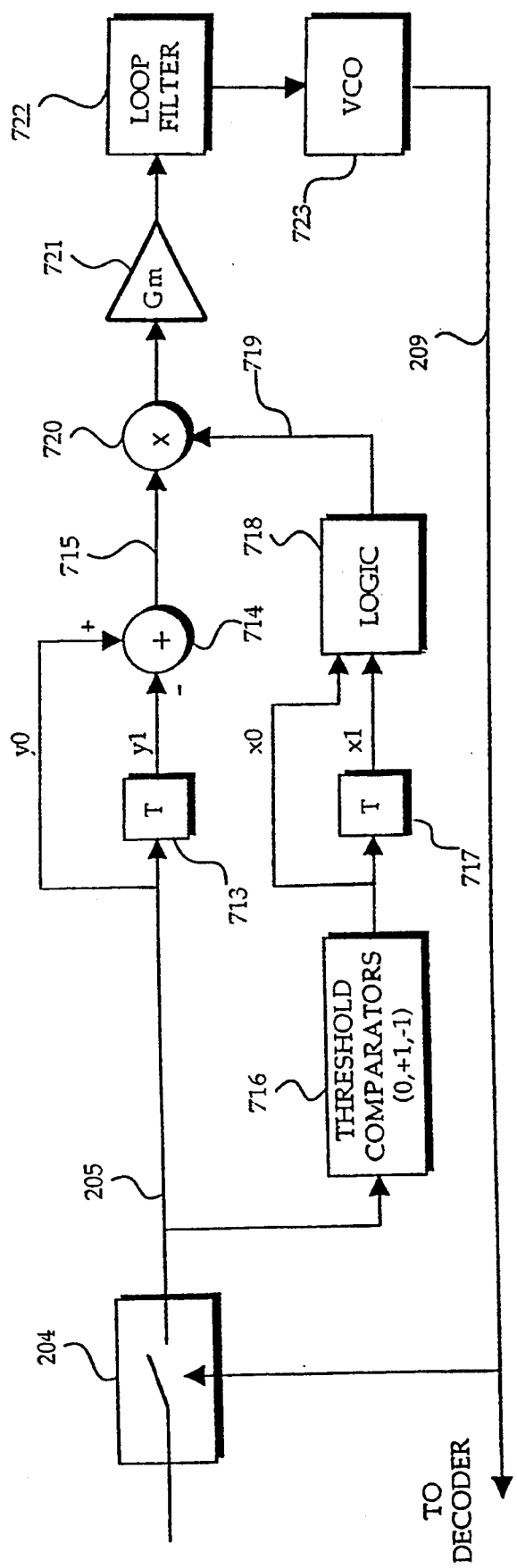
FIG. 7B is a block diagram of the preferred embodiment of the clock recovery system of the present invention.

FIG. 7B is a block diagram of the preferred embodiment of the timing recovery circuitry of the present invention. Sampler 204 from FIG. 2 is represented as a switch controlled by signal 209. The sampled signal 205 is provided to delay means 713, adder 714, and threshold comparators block 716. The threshold comparators block 716 specifies whether the sampled signal is above the positive detection threshold value, below the negative detection threshold value or neither. The respective outputs for these situations are "+1", "−1", or "0". The output of the comparators 716 is provided to delay means 717 and logic block 718 (designated as input "x0").

Delay means 713 and 717 are one clock period delays, that can be implemented in either analog or digital hardware depending on the choice for the system. For example, analog delays can be implemented with sample-and-holds, or digital delays can be implemented with registers. The output "y1" of delay 713 is subtracted from the samples input 205 (designated "y0") at subtractor 714. The resulting difference 715 is provided to multiplier 720. The output "x1" of delay 717 is provided to logic block 718. The output 719 of logic block 718 is then provided to multiplier 720.

Logic block 718 generates its output according to the following state diagram ("d" indicates a "don't care" condition):

| x0 | x1 | output |
| --- | --- | --- |
| +1 | +1 | +1 |
| −1 | −1 | −1 |
| 0 | d | 0 |
| d | 0 | 0 |
| +1 | −1 | 0 |
| −1 | +1 | 0 |

Logic 718 thus generates a scaling factor 719 with a magnitude of one for peaks and zero otherwise. The scaling factor is positive or negative depending on whether the peak is a positive or negative peak. By multiplying the difference signal 715 by scaling factor 719, lagging positive or negative peaks are differentiated from leading negative or positive peaks, respectively.

The scaled difference signal is provided to a voltage-to-current converter (Gm) 721 for determining the charging/discharging current used to drive the following loop filter 722. The output control voltage signal from loop filter 722 determines the operating frequency of a voltage-controlled oscillator (VCO) 723 to which it is coupled. The output 209 of VCO 723 is the clock signal used to control the sampling of block 204. Thus feedback is established and a phase-locked loop is formed that will lock in phase to the input signal such that the sampled values to either side of a signal peak are of equal magnitude and approximately equidistant from the peak itself. Because the sampled-data phase detector, comprising elements 713–720, is part of the phase-locked loop, and because the phase samples are extracted directly, no programmable delay is necessary, nor is noise injected into the system as is done in the peak detection circuitry of the prior art.

Figure 4A:
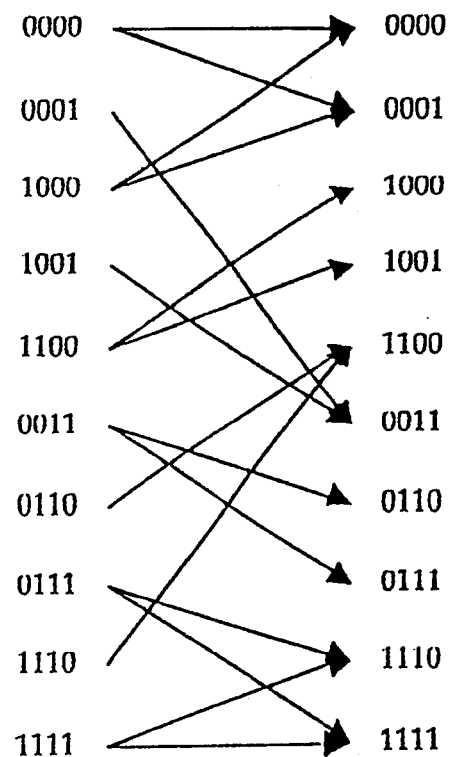
FIG. 4A illustrates the valid state transitions in the general decoding algorithm of the present invention.

Referring back to the circuit of FIG. 2, decoder 207 consists of five function calculators and comparators, and a state machine. The transition rules between states of the state machine depend upon the logic results of comparisons between the function values of the data samples and certain state-dependent thresholds. Because there are four non-zero samples in the equalized response of a single transition, 4 bits are required to represent the state of the decoder. The state of the decoder is defined as the last four binary logic levels of the write current. Because of this format, the state machine can be implemented utilizing a 4-bit shift register. The 4 bits can represent 16 states. However, out of these 16 states, only 10 are legitimate (1, 7) code patterns. FIG. 4A illustrates all of the legitimate patterns and the possible transitions between states.

Let $y_i$ denote the sampled signal value at the $i^{th}$ clock cycle, and $a_i$, $b_i$, $c_i$ and $d_i$ represent the state of the decoder at that time. In the following description, $y_0$ represents the current sampled value that is being decoded, corresponding to the clock cycle $i=0$. $a_0b_0c_0d_0$ represents the current state of the decoder and $a_1b_1c_1d_1$ is the next state. $y_1$, $y_2$, $y_3$ and $y_4$ are four look-ahead samples.

The task of decoder 207 is to determine whether a peak exists between clock cycle 1 and 2, which in turn determines the next state. FIGS. 5A and 5B describe the decoding algorithm for the decoder. The decoder first computes the results of five linear functions (Fa, Fb, Fx, Fy and Fz) with the sample values $y_0$, $y_1$, $y_2$, $y_3$ and $y_4$. The results of these functions are compared with five different state-dependent thresholds. The logic results of these comparisons are assigned to the decision variables, A, B, X, Y and Z. Based on the values of these decision variables and the current state, $a_0b_0c_0d_0$, the decoder determines what the next state and the decoded data are, according to the rules in FIG. 5B.

Functions Fa and Fb are baseline checking functions. They determine whether the sample values represent a signal that exceeds the minimum magnitude threshold needed to indicate a peak caused by a transition. Spurious peaks due to noise in the channel are thus ignored. Function Fa is responsible for determining whether a standard peak has occurred, as shown in FIG. 3B. Function Fb is constructed to test for a baseline condition in a signal that may be distorted by a following negative peak. Either Fa or Fb must be true if a peak is to be detected.

Functions Fx, Fy and Fz are responsible for determining whether the sample values fit a predetermined peak model. Fx performs a test for satisfaction of minimum conditions to distinguish a peak from the nearest valid sample model which does not form a peak. Fy performs the same test as Fx, but with a more stringent threshold value. Thus, for Fy to be true, the sample model must be sufficiently close to an ideal peak model so as to differentiate it from any other possible combination. Even a peak distorted by a subsequent peak will not pass this strict test. However, Fz tests for sample combinations typical for a peak distorted by nearby peaks. Thus, for an undistorted peak, Fx and Fy will be true, and for a peak distorted due to a nearby transition, Fx and Fz will be true. Therefore, the resulting "peak detected" binary decision is $(A+B)$ & $X$ & $(Y+Z)$. If this binary decision is true, then a transition will be indicated at the output and in the state machine, unless such a transition is prohibited by the 1,7 coding.

The thresholds for each decision function are determined by minimizing the error between an expected sample model and the next valid sample model which comes closest to it. For this reason, the thresholds for each function are dependent on the present state, as the next valid states are determined by the present state. For example, define the error of a sample combination as:

$$E=(y_0-ya)^2+(y_1-yb)^2+(y_2-yc)^2+(y_3-yd)^2+(y_4-ye)^2$$

where ya, yb, yc, yd and ye are the expected values for the model. For a first model to be selected over a second model, $E1-E2<0$. This will generate the following threshold decision:

$$(ya_2-ya_1)y_0 + (yb_2-yb_1)y_1 + (yc_2-yc_1)y_2 + (yd_2-yd_1)y_3 + (ye_2-ye_1)y_4 < (ya_2-ya_1)(ya_2+ya_1) + \ldots + (ye_2-ye_1)(ye_2+ye_1)$$

For the sample points at which the models are equal, the products including the factor $(yk_2-yk_1)$, where k is the associated sample point, are cancelled. In the negative phase, i.e. for negative transitions, the thresholds are the same, but the inequalities are reversed and the decision functions are multiplied by "$-1$". The decisions for states 0001, 1001, 1110 and 0110 are not given in FIG. 5A because their next state is constrained by the 1,7 coding scheme.

The decoded data indicates whether there is a transition at clock cycle zero, that is, whether there is a transition from state bit $c_0$ to $d_0$. This decoded data is compatible with most (1, 7) RLL decoders. The threshold values listed in FIG. 5A are considered nominal. Performance can be improved by fine-tuning these thresholds to give maximum margins in all conditions. Also, the widely used write precompensation technique can be applied to this new channel to further improve the performance. However, threshold values must be adjusted to achieve optimum results. Write precompensation is used to reduce the additional peak shift that occurs when the equalizer is adjusted to reduce the noise bandwidth.

Figure 4B:
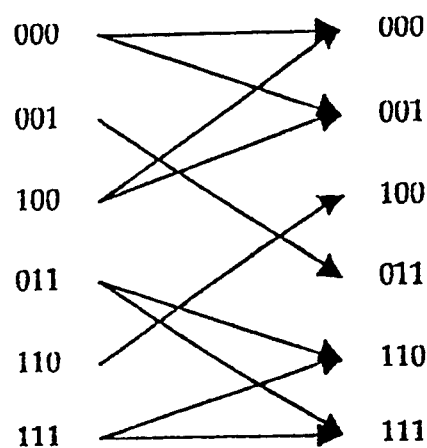
FIG. 4B illustrates the valid state transitions in the simplified decoding algorithm of the present invention.

In addition to the previously described algorithm, there is a simplified decoding algorithm allowing for an easier physical implementation. In this modified decoding scheme, a tradeoff is made between channel robustness and ease of implementation. In the general decoding algorithm, coefficients $K_1$ and $K_2$ are usually relatively small. Hence, the $K_1y_0$ and $K_2y_0$ terms can be removed from the functions. $K_3$, usually ranging from 1.5 to 2.5, can be approximated by the value of two. Since all of the $y_0$ terms are neglected, the number of bits representing the decoder state can thus be reduced from 4 to 3. FIG. 4B depicts all of the six legitimate (1, 7) code data patterns and possible transitions between these states.

FIGS. 6A and 6B describe the simplified algorithm. The complexity is significantly reduced. All computations in the functions are simple additions or subtractions. Therefore, this simplified algorithm can be easily implemented with reasonable hardware, in either analog or digital forms. All of the thresholds can be easily derived from the values of $\alpha$ and $\beta$. The value of $\beta$ is often regulated by the AGC at a predetermined level. The value of $\alpha$ can be a fixed constant for simple design. To enhance the robustness of the channel, $\alpha$ can also be constantly adapted on the fly, or calibrated with a training sequence signal pattern before the data blocks.

Thus, a new method for processing signals in a channel has been described.

We claim:

1. A signal channel comprising:
   sampling means for sampling an analog input signal at discrete moments in time according to a clock signal, said analog input signal carrying encoded binary data;
   decoding means for generating a sequence of digital outputs based upon samples from said sampling means;

clock recovery means coupled to said sampling means and said decoding means to provide said clock signal, said clock recovery means generating said clock signal based upon said samples, said clock recovery means comprising means for determining a difference between signal levels of consecutive samples.

2. The apparatus of claim 1 wherein said clock recovery means further comprises:
    scaling means for scaling said difference by a scale factor, said scale factor being determined by the occurrence and positive or negative direction of a signal peak in said sampled analog signal;
    a voltage-controlled oscillator having an output frequency dependent on said difference in signal levels, said voltage-controlled oscillator generating said clock signal.

3. The apparatus of claim 1 further comprising an analog-to-digital converter for transforming said samples into digital values.

4. The apparatus of claim 1 further comprising an equalizer for conditioning said analog signal, such that said analog signal more closely resembles an ideal waveform.

5. The apparatus of claim 1 further comprising a filter for removing undesired frequency components from said analog signal prior to sampling.

6. The apparatus of claim 1 further comprising an automatic gain control circuit coupled to said analog input signal and said sampling means for maintaining said analog signal at a predetermined level.

7. A method for achieving clock recovery in a RLL channel comprising the steps of:
    sampling an analog signal;
    comparing signal levels of at least two consecutive samples to ascertain a signal level difference;
    varying phase and frequency of a variable frequency oscillator as a function of said signal level difference and a prior frequency;
    triggering said sampling process according to the phase and frequency of said oscillator.

* * * * *